US011139969B2

(12) United States Patent
Iyer et al.

(10) Patent No.: US 11,139,969 B2
(45) Date of Patent: Oct. 5, 2021

(54) CENTRALIZED SYSTEM FOR A HARDWARE SECURITY MODULE FOR ACCESS TO ENCRYPTION KEYS

(71) Applicant: BANK OF AMERICA CORPORATION, Charlotte, NC (US)

(72) Inventors: Shankar R. Iyer, East Windsor, NJ (US); Maria Dominique, Kendall Park, NJ (US); Navanith Keerthi, Lawrenceville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 283 days.

(21) Appl. No.: 16/209,667

(22) Filed: Dec. 4, 2018

(65) Prior Publication Data

US 2020/0177383 A1   Jun. 4, 2020

(51) Int. Cl.
*H04L 9/08* (2006.01)
*G06F 21/60* (2013.01)
(Continued)

(52) U.S. Cl.
CPC ............ *H04L 9/0897* (2013.01); *G06F 21/44* (2013.01); *G06F 21/602* (2013.01); *G06F 21/62* (2013.01);
(Continued)

(58) Field of Classification Search
CPC ... H04L 9/0897; H04L 9/0861; H04L 9/3234; H04L 9/0877; G06F 21/602; G06F 21/78;
(Continued)

(56) References Cited

U.S. PATENT DOCUMENTS 6,256,733 B1   7/2001 Thakkar et al.
6,351,539 B1   2/2002 Djakovic
(Continued)

FOREIGN PATENT DOCUMENTS

WO   WO-2018218349 A1 * 12/2018 ............. G06F 21/76

OTHER PUBLICATIONS

"SafeNet Network HSM (Formerly SafeNet Luna SA)—Product Brief", 2016, Gemalto, 2 pages (Year: 2016).*
(Continued)

*Primary Examiner* — Carl G Colin
*Assistant Examiner* — Han Yang
(74) *Attorney, Agent, or Firm* — Michael A. Springs; Moore & Van Allen PLLC; Jeffrey R. Gray

(57) ABSTRACT

Hardware Security Modules (HSMs) are used to secure data, such as encryption keys. Access to HSMs may be shared across applications, and virtualized to allow the HSMs to generate, store, and provide encryption and decryption processes to various applications when the HSMs are located apart from the particular systems on which the applications are stored. This configuration allows for application owners or developers to easily interface with the HSMs, such that applications may simply request an encryption key from the HSMs, utilize the encryption key for encrypting data, store the encryption key within the HSMs, and/or retrieve the encryption key for decryption without the disadvantages associated with HSMs. Utilizing centralized HSMs improves the efficiency of use, memory storage, and security of the HSMs, due at least in part to allowing application owners and/or developers to interface with HSMs without forcing cryptographic processes that are specific to the application.

20 Claims, 2 Drawing Sheets

(51) Int. Cl.
*G06F 21/78* (2013.01)
*G06F 21/44* (2013.01)
*G06F 21/62* (2013.01)

(52) U.S. Cl.
CPC ............ *G06F 21/78* (2013.01); *H04L 9/0861* (2013.01); *G06F 2221/2141* (2013.01)

(58) Field of Classification Search
CPC ... G06F 21/44; G06F 21/62; G06F 2221/2141
See application file for complete search history.

(56) References Cited

U.S. PATENT DOCUMENTS

| | | | |
|---|---|---|---|
| 7,278,582 | B1 | 10/2007 | Siegel et al. |
| 8,302,172 | B2 | 10/2012 | Grandcolas et al. |
| 8,312,272 | B1 | 11/2012 | Serenyi et al. |
| 8,631,247 | B2 | 1/2014 | OLoughlin et al. |
| 8,855,296 | B2 | 10/2014 | Pauker et al. |
| 8,972,721 | B2 | 3/2015 | Neill et al. |
| 9,344,455 | B2 | 5/2016 | Himawan et al. |
| 9,571,279 | B2 * | 2/2017 | Kancharla ............... H04L 63/06 |
| 9,660,970 | B1 | 5/2017 | Rubin et al. |
| 9,678,896 | B2 | 6/2017 | OLoughlin et al. |
| 9,756,022 | B2 | 9/2017 | Amiri et al. |
| 9,767,293 | B2 | 9/2017 | Boenisch et al. |
| 9,973,496 | B2 | 5/2018 | Boenisch et al. |
| 10,417,455 | B2 * | 9/2019 | Couillard ............... H04L 63/10 |
| 10,574,442 | B2 | 2/2020 | Amiri et al. |
| 2008/0170693 | A1 | 7/2008 | Spies et al. |
| 2009/0292919 | A1 | 11/2009 | England |
| 2010/0082991 | A1 | 4/2010 | Baldwin et al. |
| 2010/0111297 | A1 | 5/2010 | Pauker et al. |
| 2010/0177885 | A1 | 7/2010 | Bates et al. |
| 2011/0191599 | A1 | 8/2011 | Chou et al. |
| 2011/0246785 | A1 | 10/2011 | Linsley et al. |
| 2011/0289324 | A1 | 11/2011 | Yellepeddy et al. |
| 2012/0131354 | A1 * | 5/2012 | French ................... H04L 9/3271 713/189 |
| 2012/0281827 | A1 | 11/2012 | Wan et al. |
| 2012/0281839 | A1 | 11/2012 | Arnold et al. |
| 2013/0044880 | A1 | 2/2013 | Arnold et al. |
| 2013/0179676 | A1 | 7/2013 | Hamid |
| 2013/0339252 | A1 | 12/2013 | Pauker et al. |
| 2014/0082707 | A1 | 3/2014 | Egan et al. |
| 2014/0237236 | A1 | 8/2014 | Kalinichenko et al. |
| 2015/0149771 | A1 | 5/2015 | Yen et al. |
| 2016/0149877 | A1 * | 5/2016 | Kancharla ............. H04L 9/3234 713/171 |
| 2017/0193077 | A1 | 7/2017 | Goikhman et al. |
| 2017/0272472 | A1 | 9/2017 | Adhar |
| 2018/0060596 | A1 * | 3/2018 | Hamel ..................... G06F 21/64 |
| 2018/0316491 | A1 | 11/2018 | Pivovarov |
| 2019/0132127 | A1 * | 5/2019 | Birke ..................... H04L 9/0877 |
| 2020/0111080 | A1 | 4/2020 | Metcalfe et al. |
| 2020/0175179 | A1 * | 6/2020 | Iyer ........................ H04L 9/0618 |
| 2020/0177384 | A1 * | 6/2020 | Iyer ........................ G06F 21/602 |

OTHER PUBLICATIONS

"Securing Network—Attached HSMs:The SafeNet Luna SA Three-Layer Authentication Model White Paper", 2010, SafeNet, 9 pages (Year: 2010).*

* cited by examiner

CENTRALIZED SYSTEM FOR A HARDWARE SECURITY MODULE FOR ACCESS TO ENCRYPTION KEYS

FIELD

The present invention relates to encryption, and more particularly, to utilizing keys and hardware security modules to provide encryption services more efficiently and with improved memory storage.

BACKGROUND

Hardware security modules (HSMs) are devices that provide data protection; however, HSMs are expensive, complex to store and retrieve secure data, require crypto processing and programing knowledge to implement and use, and do not allow for efficient storage of data due to the increased security features of the HSMs.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved Hardware Security Module(s) (HSMs) by providing improved encryption for increased memory storage within HSMs, and providing improved security for the HSMs. The HSMs are computing devices that can be used for securely storing and managing encryption keys, which can be used in data security for encrypting data using crypto processing (e.g., processing that utilizes the encryption key to encrypt and decrypt the data, or the like). These HSMs may be operatively coupled to systems (e.g., computers, services, or the like) to provide encrypting processing for a particular system or application thereof. HSMs have a number of benefits, such as but not limited to the generation of secure cryptographic keys, secure storage of the key, key management capabilities, key retrieval, and/or the like. HSMs may be certified to international standards to provide assurance that the HSMs are secure. HSMs may include features to improve security, such as taking a security action when unauthorized users try to breach the HSMs. The security actions may include preventing tampering of the keys and/or data therein, providing alerts, deleting keys, or the like when unauthorized user are detected.

HSMs also have disadvantages, in that they are expensive, require knowledge of programing crypto processing in order to implement and use the HSMs, have limited uses that relate in particular to key generation and storage, which may only be needed in particular applications. For example, for any confidential information within an organization, the confidential information may be encrypted using the encryption keys and crypto processing, and such encryption keys can be stored securely within the HSMs. In order to protect confidential information, and in particular, large amounts of confidential information, an organization may have to have thousands of keys, which would require a large number of HSMs to store the keys securely. Alternatively, smaller organizations may only need a few encryption keys, which when stored within an HSM would only take up a small amount of the memory of the HSM. Moreover, in order to be able to keep organizations (large or small) operational when the primary HSMs are down, redundant HSMs may be required to handle backup encryption and decryptions processes. Most organizations only utilize a limited amount of memory of an HSM (e.g., about 1% to 5%, or the like) because the HSM is dedicated equipment that is coupled to specific systems and/or specific applications associated with the systems. That is, typically an HSM is attached at a dedicated server that is used for one application, and thus provides encryption only for the dedicated server and associated application. As such, the HSM is not used for anything besides encryption. Furthermore, some regulatory agencies require that encryption be performed in the HSM, and require that the encryption process never leaves the HSM (i.e., because the HSM provides the security features described herein), and thus, organizations adhering to the regulatory agencies are required to use the HSMs. As previously discussed, HSM also have issues in that they require the application providers to have knowledge of mathematical calculations and cryptographic skill in order to program and set up the HSM for use with the specific systems and/or applications that require encryption (e.g., based on regulatory requirements or internal organization requirements), which may be an issue for small organizations, as well as individual application owners within large organizations. Small organizations and/or individual application owners do not always have the requisite skill to implement and maintain the use of the HSMs within the organization and/or for a particular application. As such, depending on the needs of the organization, multiple keys may be created, maintained, stored, or the like on the HSMs, and such encryption and decryption processes may be required to be performed within the HSMs. Moreover, the number of keys needed for the organization could grow over time and would require additional storage over time. Consequently, despite the issues associated with HSMs, it should be understood that they may be necessary for the operation of the organization.

The present invention provides systems and processes for utilization of the HSMs, which improve the efficiency of use, memory storage, and security of the HSMs. Embodiments of the invention herein relate to sharing one or more HSMs across systems and/or applications (e.g., through the use of cloud services, or the like), as well as virtualizing the one or more HSMs (e.g., through the use of application programing interfaces, or the like) that allow the HSMs to generate, store, and provide encryption and decryption processes within the HSMs to various systems and/or applications when the one or more HSMs are located apart from the particular systems on which the applications are stored. The systems and process of the present invention, allow for application owners and/or developers to easily interface with the HSMs, such that applications may simply request an encryption key from the HSMs, utilize the encryption key for encrypting data, store the encryption key within the HSMs, and/or retrieve the encryption key for decryption without having to deal with the disadvantages associated with the HSMs. That is, the systems related to the application making the call do not have to be directly coupled to the HSM, and the application developer does not have to program the applications and/or a specific HSM with cryptographic processes that are specific to the application. Instead, the application developer only has to call for the encryption key and the API associated with the HSM includes all of the programming and crypto processing necessary to interact with the HSM on behalf of the application. The API and/or the HSMs will perform the key generation, key storage, and/or cryptography for encryption and/or decryption, or the like. Additionally, the HSMs may be utilized for multiple systems and/or applications of a single or multiple parties in order to efficiently utilize the memory of the HSMs. That is the API may allow for use of a plurality of HSMs, such that different entities (e.g., the organization and other third parties) may utilize the API to access and communicate with the HSMs through the cloud, in order to receive encryption services remotely and more efficiently.

Embodiments of the invention comprise systems, computer implemented method, and computer program products for a centralized hardware security module (HSM) system for encryption. The invention comprises receiving a request from an application to call an encryption key from one or more HSMs, authenticating the application for access to the one or more HSMs, identifying the encryption key from a plurality of encryption keys for the application within the one or more HSMs, and providing the encryption key for decryption.

In further accord with embodiments, the invention comprises setting up the one or more HSMs to provide encryption services to a plurality of applications, creating an application programing interface (API) to interact with the plurality or applications, and wherein each of the plurality of applications can request one or more encryption keys from the plurality of encryption keys for encryption from the one or more HSMs through the API without programing cryptography to implement the plurality of encryption keys.

In other embodiments of the invention, setting up the one or more HSMs to provide encryption services to a plurality applications comprises assigning each of the plurality of applications to one or more HSMs and a partition from a plurality of partitions within the one or more HSMs, wherein the plurality of partitions separate memory of the one or more HSMs into separate parts of the one or more HSMs.

In still other embodiments, the invention further comprises receiving a request from the application to create the encryption key for the application, utilizing the encryption key to encrypt application data, and storing the encryption key within the one or more HSMs.

In yet other embodiments of the invention, authenticating the application for access to the one or more HSMs comprises identifying access rights of the application from an encryption rules engine within the one or encryption systems.

In further accord with embodiments, the invention comprises assigning an application identifier to the encryption key, wherein identifying the encryption key from the plurality of encryption keys comprises comparing the application with application identifiers associated with the plurality of encryption keys to identify the application identifier corresponding to the application.

In other embodiments of the invention, the application identifier is a machine identifier on which the application is stored.

In still other embodiments of the invention, providing the encryption key to the application for decryption comprises receiving encrypted data from the application for decryption, identifying data from the encrypted data using the encryption key, and providing the application the data decrypted.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
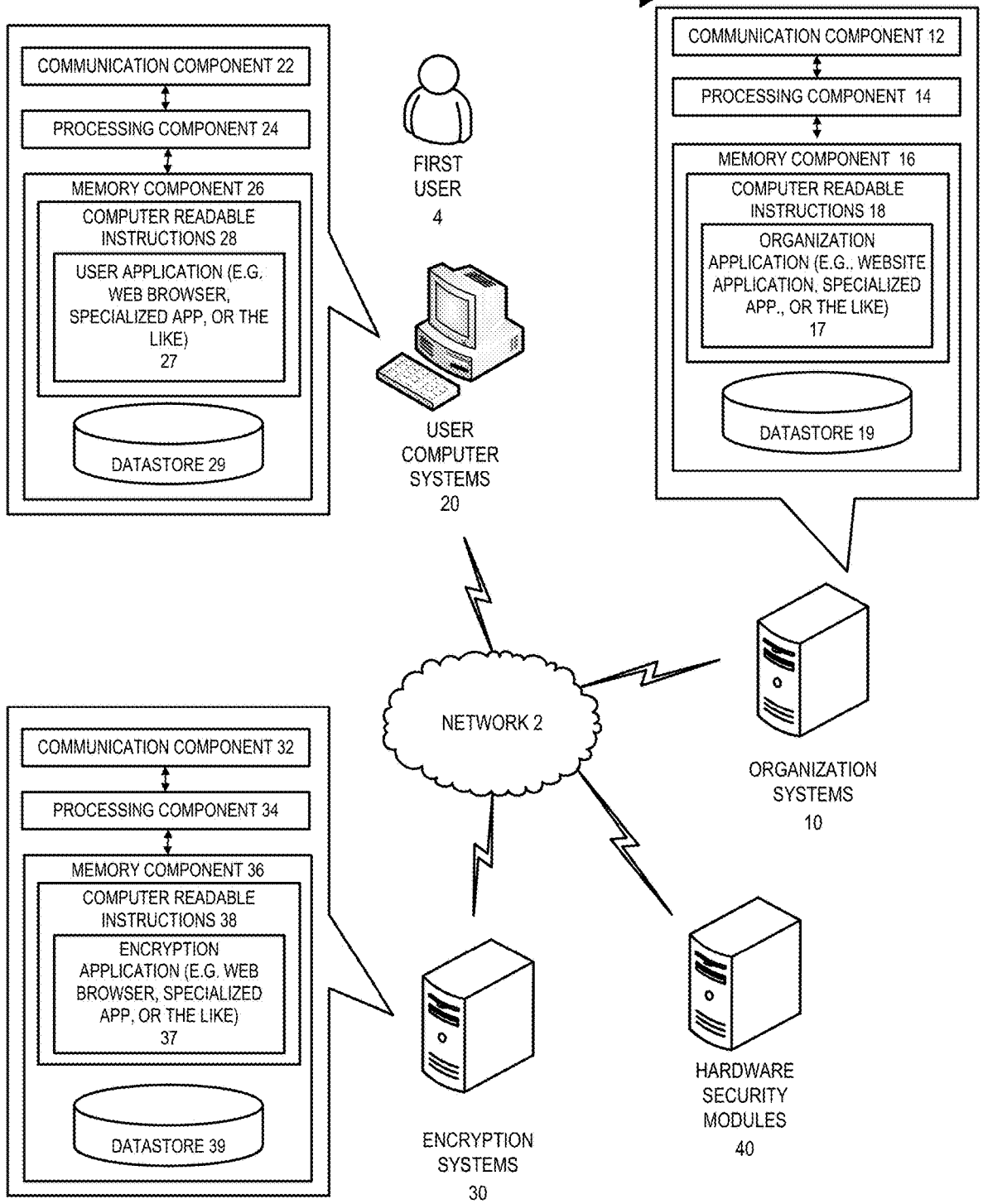

Having thus described embodiments of the invention in general terms, reference will now be made to the accompanying drawings, and wherein:

FIG. 1 illustrates a block system diagram of an HSM encryption system environment, in accordance with embodiments of the invention.

Figure 2:
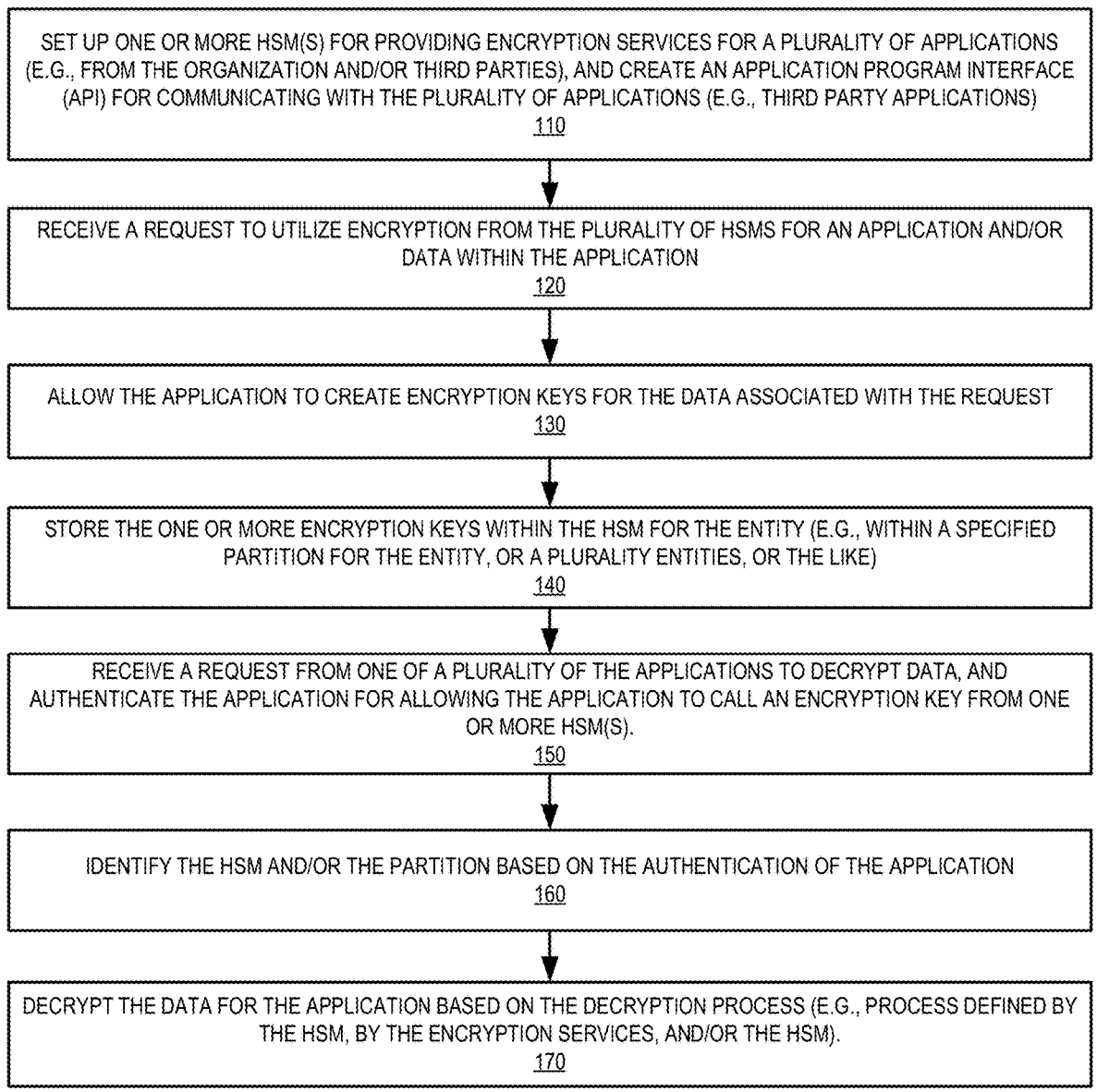

FIG. 2 illustrates a process flow regarding a HSM encryption service, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed for improved Hardware Security Module(s) (HSMs) by providing improved encryption for increased memory storage within HSMs, and providing improved security for the HSMs. The HSMs are computing devices that can be used for securely storing and managing encryption keys, which can be used in data security for encrypting data using crypto processing (e.g., processing that utilizes the encryption key to encrypt and decrypt the data, or the like). These HSMs may be operatively coupled to systems (e.g., computers, services, or the like) to provide encrypting processing for a particular system or application thereof. HSMs have a number of benefits, such as but not limited to the generation of secure cryptographic keys, secure storage of the keys, key management capabilities, key retrieval, and/or the like. HSMs may be certified to international standards to provide assurance that the HSMs are secure. HSMs may include features to improve security, such as taking a security action when unauthorized users try to breach the HSMs. The security actions may include preventing tampering of the keys and/or data therein, providing alerts, deleting keys, or the like when unauthorized users are detected.

HSMs also have disadvantages, in that they are expensive, require knowledge of programming crypto processing in order to implement and use the HSMs, have limited uses that relate in particular to key generation and storage, which may only be needed in particular applications. For example, for any confidential information within an organization, the confidential information may be encrypted using the encryption keys and crypto processing, and such encryption keys can be stored securely within the HSMs. In order to protect confidential information, and in particular, large amounts of confidential information, an organization may have to have thousands of keys, which would require a large number of HSMs to store the keys securely. Alternatively, smaller organizations may only need a few encryption keys, which when stored within an HSM would only take up a small amount of the memory of the HSM. Moreover, in order to be able to keep organizations (large or small) operational when the primary HSMs are down, redundant HSMs may be required to handle backup encryption and decryptions processes. Most organizations only utilize a limited amount of memory of an HSM (e.g., about 1% to 5%, or the like) because the HSM is dedicated equipment that is coupled to specific systems and/or specific applications associated with the systems. That is, typically an HSM is attached at a dedicated server that is used for one application, and thus provides encryption only for the dedicated server and associated application. As such, the HSM is not used for anything besides encryption. Furthermore, some regulatory agencies require that encryption be performed in the HSM, and require that the encryption process never leaves the HSM (i.e., because the HSM provides the security features described herein), and thus, organizations adhering to the regulatory agencies are required to use the HSMs. As previously discussed, HSMs also have issues in that they require the application providers to have knowledge of mathematical calculations and cryptographic skill in order to program and set up the HSMs for use with the specific systems and/or applications that require encryption (e.g., based on regulatory requirements or internal organization requirements), which may be an issue for small organizations, as well as individual application owners within large organizations. Small organizations and/or individual application owners do not always have the requisite skill to implement and maintain the use of the HSMs within the organization and/or for a particular application. As such, depending on the needs of the organization, multiple keys may be created, maintained, stored, or the like on the HSMs, and such encryption and decryption processes may be required to be performed within the HSMs. Moreover, the number of keys needed for the organization could grow over time and would require additional storage over time. Consequently, despite the issues associated with HSMs, it should be understood that they may be necessary for the operation of the organization.

FIG. 1 illustrates an HSM encryption system environment 1, in accordance with embodiments of the invention. As illustrated in FIG. 1, one or more organization systems 10 are operatively coupled, via a network 2, to one or more user computer systems 20, one or more encryption systems 30, one or more hardware security modules (HSMs) 40, and/or one or more other systems (not illustrated). In this way, the user 4 (e.g., one or more associates, employees, agents, contractors, sub-contractors, third-party representatives, customers, or the like), through a user application 27 (e.g., web browser, dedicated or specialized application, or the like), may utilize the one or more organization systems 10, the one or more encryption systems 30, the one or more HSMs 40, and/or the one or more other systems in order to provide improved encryption security, improved memory storage for HSMs, as will be discussed herein in further detail.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the one or more user computer systems 20, the one or more encryption systems 30, the one or more HSMs 40, and/or the one or more other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors, or the like.

As further illustrated in FIG. 1, the one or more organization systems 10 comprise computer-readable instructions 18 stored in the one or more memory components 16, which in some embodiments includes the computer-readable instructions 18 of the one or more organization applications 17 (e.g., secure website application, secure dedicated application, or the like). In some embodiments, the one or more memory components 16 include one or more data stores 19 for storing data related to the one or more organization systems 10, including, but not limited to, data created, accessed, and/or used by the one or more organization applications 17. The organization may utilize the encryption provided by the one or more encryption systems 30 and/or the one or more HSMs 40 in order to secure confidential information of the organization.

As illustrated in FIG. 1, users 4 may access the one or more organization systems 10, the one or more encryption systems 30, and/or the one or more HSMs 40, to set up and utilize the encryption services discussed herein. The one or more user computer system 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the one or more organization systems 10, the one or more encryption systems 30, the one or more HSMs 40, and/or the other systems (e.g., one or more third party systems, or the like). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touchscreen, touchpad, microphone, mouse, joystick, other pointer component, button, soft key, and/or other input/output component(s) for communicating with the users 4.

As illustrated in FIG. 1, the one or more user computer systems 20 may have computer-readable instructions 28 stored in the one or more memory components 26, which in some embodiments includes the computer-readable instructions 28 for user applications 27, such as dedicated applications (e.g., apps, applet, or the like), portions of dedicated applications, a web browser or other apps that allow access to applications located on other systems, or the like. The user application 27 uses the applications of the one or more organization systems 10, the one or more encryption systems 30, and/or the one or more HSMs in order to set up, manage, and/or use the HSMs, encrypt, decrypt, and/or utilize the keys, as will be discussed herein.

As illustrated in FIG. 1, one or more encryption systems 30 may be utilized by the one or more organization systems 10, the one or more user computer systems 20, and/or the HSMs to create, store, and utilize encryption keys using HSMs in a way that increases the memory capabilities and efficiency of the HSMs. As such, the one or more encryption systems 30 are operatively coupled, via a network 2, to the one or more organization systems 10, the one or more user computer systems 20, the one or more HSMs 40, and/or the other systems (not illustrated). The one or more encryption systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more user computer systems 20, the one or more HSMs 40, and/or the one or more other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more encryption systems 30 may have computer-readable instructions 38 stored in the one or more memory components 36, which in one embodiment includes the computer-readable instructions 38 of one or more encryption applications 37, which allow for the management of the HSMs and/or the keys therein, storage of wrapped encryption keys outside of the HSMs to save memory within the HSMs, provide the API and/or GUI interfaces for the HSMs that allows for the management and/or communication with the HSMs and/or the keys thereof by applications without the need for cryptographic programming and/or processing.

Moreover, as illustrated in FIG. 1, the one or more HSMs and/or other like systems are operatively coupled to the one or more organization systems 10, the one or more user computer systems 20, and/or the one or more encryption systems 30, through the network 2. The one or more HSMs, and/or other like systems have components the same as or similar to the components described with respect to the one or more organization systems 10, the one or more user computer systems 20, and/or the one or more encryption systems 30 (e.g., one or more communication components, one or more processing components, and one or more memory devices with computer-readable instructions of one or more applications, one or more datastores, or the like). Thus, the one or more HSMs communicate with the one or more organization systems 10, the one or more user computer systems 20, the one or more encryption systems 30, and/or each other in same or similar way as previously described with respect to the one or more organization systems 10, the one or more user computer systems 20, and/or the one or more encryption systems 30.

The one or more HSMs may comprise computing devices that securely store and manage digital keys using crypto processing. These HSMs may be operatively coupled to a computer or server, or other like system. HSMs have a number of benefits, such as but not limited to generation of secure cryptographic keys, storing the keys, providing key management, allowing for the use of the keys to provide security, and/or the like. HSMs are certified to international standards to provide assurance that the HSMs are secure. HSMs provide improved security by taking a security action when unauthorized users try to breach the HSMs, and such actions may include preventing or identify tampering, bus probing, key deletion, notifications, or the like when unauthorized users are detected.

The one or more other systems (not illustrated) may include the systems, and components thereof, for allowing communications between the systems (e.g., intermediaries that act as gateways, APIs, or the like to allow communication between the systems), may be third-parties systems that communicate with the one or more organization systems 10 and/or other systems described herein, such as in order to allow interactions between the one or more organizations and the third-parties. Moreover, the one or more other systems may be third-parties systems that utilize the HSMs as a service provided by the organization.

Generally it should be understood that HSMs may be utilized to store keys that are used for encrypting data that is located within the HSM or outside of the HSM. However, since HSMs are typically expensive, and thus, computing space within the HSMs are limited, HSMs are used to store keys for encryption and decryption of data located outside of the HSMs. It should be understood that HSMs may be able to store keys or other information related to any type of encryption process, however, typical types of encryption may include utilizing public-private key pairs, symmetric keys, algorithms, quantum computing security, or other cryptography to create the encryption and/or decryption processes described herein. Creating encryption using the public-private key pair, or symmetric keys may be the most common ways of encrypting and decrypting data.

As such, in some aspects of the invention, the HSM may generate, store, and/or allow access to one or more keys for use in encrypting and/or decrypting data. In the case of symmetric keys, the systems that use and/or store the data have the same key that is used to both encrypt and decrypt the data. Alternatively, which respect to public-private keys, a public key is used to encrypt a session key (e.g., a key used by both parties to transfer data) to create an encrypted key (e.g., encrypted symmetric session key). The application then sends the unique encrypted key to the other system (e.g., other application and/or other party). The other system decrypts the unique encrypted key using the private key paired with the public key used to create the encrypted key, which only the receiving party has in order to read the unique encrypted key to identify the session key created. As such, the systems (or applications thereof) have created a secure link, and can send encrypted information between the two using the symmetric session key because only the two systems have the decrypted session key. Communications made between the systems (or applications thereof) are encrypted with the unique session key since only the systems have the unique session key. In some embodiments of the invention, multiple public and private key pairs may be utilized to encrypt, share, and decrypt in order to provide additional security when sharing the symmetric session key. After the session is terminated the unique session key may be deleted and/or returned to a pool of unique session keys to be used at a future point in time. Alternatively, or additionally, a key can be used to encrypt the data itself in order to transfer the encrypted data over a network (e.g., secured or unsecured network), such as data stored on a database and/or within a cloud. The keys used to encrypt and decrypt data, other session keys, or the like, may be generated, used for encryption, stored, and/or recalled for decryption through the use of the HSMs, as will be described in further detail herein.

FIG. 2 illustrates a process flow for configuring and utilizing an HSM encryption service, in accordance with embodiments of the present disclosure. Block 110 of FIG. 2 illustrates that one or more HSMs (e.g., a plurality of HSMs) are set up for providing encryption services for a plurality of applications (e.g., from within a single organization and/or from one or more third-parties outside of the organization). As previously discussed herein HSMs are typically directly attached to a server or other system in order to provide encryption services for a single application that is located on the server or system. Instead in the present disclosure, the one or more HSMs may be set up apart from the systems (e.g., servers, or the like), and in some embodiments may be set up as a cloud system. Setting up the one or more HSMs may include creating systems that include one or more HSMs that may be accessed through the cloud. Moreover, HSMs typically require each application accessing the HSM to be programed with encryption processes that utilize the encryption keys generated and stored within the HSMs. That is, HSMs require that applications include the code to communicate with the HSMs to handle generation, encryption, storage, decryption, and management of the encryption keys and/or the processes for encrypting and decrypting data for the applications. Alternatively, in the present invention, setting up the HSMs may include creating, directly, or through one or more encryption systems 30, one or more application programing interfaces ("APIs") that allow applications (e.g., within the organization and/or from one or more third-parties), to utilize the benefits of HSMs without having to have knowledge of cryptography programing, processing, or the like. That is, the one or more HSM APIs allow applications to request the generation, storage, and/or retrieval of an encryption key, and the API (e.g., through the one or more encryption systems 30, or the like) has the cryptography applications, programing, and processing to communicate with the HSMs to generate the keys, preform the encryption, store the keys, recall the keys, perform the decryption, and/or the like. As such, each of the applications accessing the HSM do not require the specific cryptography processing and programming typically required when using an HSM for encryption. Moreover, in some embodiments the HSMs and/or the one or more encryption systems 30, may provide a graphical user interface (GUI) to allow the users 4 associated with the applications to easily set up encryption processing through the GUI. For example, in order for an application to utilize encryption through the use of an HSM, the application may only request an encryption key through the API. Thereafter, the API will communicate with the HSM in order to request the encryption key, perform the encryption on the data for the application, store the encryption key in the HSM, and provide the encrypted data to the application. Moreover, the API may perform the decryption process for application when the application call for retrieval of the encryption key for decryption.

Additionally, setting the up the plurality of HSMs, may also include creating authentication processes for the plurality of applications, systems, and/or the users 4 associated therewith, that allow the authenticated applications to access the HSMs (e.g., directly or through the use of the APIs), while preventing the unauthorized access to the HSMs. As such, the one or more encryption systems 30 may include authentication processes and store authentication credentials that manage access to the encryption services provided.

Block 120 of FIG. 2, illustrates that a request may be received from an application from a plurality of applications (e.g., organization applications, third party applications, or the like) to utilize encryption services provided by the one or more HSMs, directly, or through the use of the one or more encryption systems 30. The request may be from a user 4 associated with the organization, a third-party, or the like (or an application associated therewith). The request may relate to approval to utilize the encryption services for the first time (e.g., request on-boarding, or the like), or may be a request from a returning entity that would like to utilize encryption services to encrypt data. The application (e.g., the application, systems, and/or or user 4 associated with the application), may be on-boarded for current use, future authentication, or the like. Alternatively the application (e.g., the application, systems, and/or or user 4 associated with the application) may be authenticated for accessing the encryption services, as will be described in further detail later.

It should be understood that the application (e.g., application, system, and/or entity associated therewith) may be assigned to a particular HSM (e.g., from a pool of HSMs within a cloud system) and/or to a particular partition within the HSM. For example, the HSM (e.g., the memory within, or the like) may be split into a plurality of partitions that separate the encryption keys from each other to improve the memory storage, to allow for quickly identifying the location of the encryption keys, and/or for improving management of the encryption keys within the HSM. As such, a particular application may be assigned to one of the one or more HSMs and one of the one or more partitions within the HSM. Moreover, any encryption keys requested by the application may be generated, stored, and/or used within the assigned partition within the HSM.

Block 130 of FIG. 2 illustrates that an application (e.g., application, systems, and/or user 4 associated therewith) is allowed to create encryption for the application and/or data associated therewith. For example, the application may include data related to confidential information of an entity (e.g., the organization, third parties, or the like), such as but not limited to user names, passwords, account numbers, balances, interactions (e.g., transactions), addresses, ID numbers (e.g., SSNs, license numbers, or the like), document access, customer lists, confidential processes, formula, specification, and/or any other type of data that may require encryption, or which an entity would like to encrypt. The request may include generating and/or retrieving (e.g., from a plurality of pre-generated and pre-stored encryption keys) an encryption key to perform the encryption and utilizing the encryption key to encrypt the data (e.g., encrypt the data using the key through the use of one or more of any type of cryptography). It should be understood that the encryption of the data using the encryption key may occur outside of the HSM, within the HSM (e.g., to improve security by keeping the encryption key within the HSM), and/or the like.

Block 140 of FIG. 2, further illustrates that the encryption key (e.g., generated and/or retrieved) is stored within the HSM after it is used for encrypting the data. It should be understood that as previously described above, the encryption key may be stored within a particular HSM and/or a partition within the HSM. For example, the encryption key may be stored within a HSM and/or partition thereof based on the HSM and/or partition to which the application has been assigned. In some embodiments, the encryption key may be assigned a key identifier (e.g., application identifier, data identifier, handle, and/or the like) that associates the encryption key with an application and/or data associated therewith. The key identifier may be further be assigned based on the HSM (e.g., from a plurality of HSMs) and/or a partition within the HSM (e.g., from a plurality of partitions), which may also be used to store the encryption key within a particular HSM and/or a partition therein. The key identifier may be utilized when identifying what encryption key to use when a request is received from an application.

FIG. 2 illustrates in block 150, that a request is received from an application from a plurality of applications. The request may be to decrypt data associated with the application making the request. The application (e.g., the system, application, and/or entity) may be authenticated to access the encryption key. Authentication may be any type of authentication. In some embodiments, the request is made through the API, which communicates with the one or more HSMs on behalf of the application.

Block 160 of FIG. 2 further illustrates that the encryption key for the application and/or data within is identified. That is, the authentication process that allows the application to access the HSMs may also be used to determine the HSM and/or partition therein that stores the encryption key associated with the application (or data within). In some embodiments, an identifier associated with the application (e.g., application identifier, machine identifier, data identifier, or the like) is used to determine the location of the encryption key within the one or more HSMs. For example, the API may use the authentication of the application in order to identify what HSM from the plurality of HSMs, and what partition from the plurality of partitions of the HSM stores the encryption key. Furthermore, in some embodiments the encryption key that the application requests may be identified from the plurality of encryption keys within a partition by the key identifier of the encryption key, which may be included in the request made by the application and/or API.

FIG. 2 further illustrates in block 170 that the decryption process is performed based on the request from the application. The decryption process may occur within an HSM (e.g., to maintain additional security), or outside of the HSM (e.g., to improve memory requirements for performing the encryption). It should be further understood that the decryption process may be defined by the HSMs, the encryption systems that control the API used to access the HSMs, and/or the application itself. As such, the decryption process may be based on the encryption defined during the encryption process. Furthermore, the decryption process may be different for different types of data within the same application. For example, less important data may only use a single key and single encryption process, while more important data may include using multiple encryption keys and/or multiple encryption processes using the multiple encryption keys.

It should be further understood, that while the present description describes generally that the encryption, decryption, and/or other processes may occur outside of the HSM, in some embodiments of the invention all of the processing may occur within the HSM. That is, in some embodiments, the key generation, encryption, decryption, signing, verification, or other like process may all occur within the HSM. As such, performing these processes within the HSM improves the security associated with the encryption and decryption processes because of the additional security features provided by HSMs.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively monitoring the resource usage and availability. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously monitoring the real-time data feeds from the various systems, the systems may be configured to update activities associated with the systems, as described herein.

Moreover, it should be understood that the process flows described herein include transforming the data from the different systems (e.g., internally or externally) from the data format of the various systems to a data format associated with the reports for display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. Patent application Ser. No. | Title | Filed On |
| --- | --- | --- |
| 16/209,670 | SYSTEM FOR TRIPLE FORMAT PRESERVING ENCRYPTION | Concurrently herewith |
| 16/209,674 | SCALABLE HARDWARE ENCRYPTION | Concurrently herewith |

What is claimed is:

1. A centralized hardware security module (HSM) system for encryption, the system comprising:
   one or more memory devices having computer readable code stored thereon; and
   one or more processing devices operatively coupled to the one or more memory devices, wherein the one or more processing devices are configured to execute the computer readable code to:
      receive a request from an application of an entity to call an encryption key from one or more HSMs through an application programming interface (API), wherein the one or more HSMs each comprises a plurality of partitions, wherein the plurality of partitions separate memory of each the one or more HSMs into separate parts of each of the one or more HSMs, and wherein the plurality of partitions are separated based on entities and applications for the entities;
      authenticate the application for access to the one or more HSMs;

identify the encryption key from a plurality of encryption keys for the application within a partition of one or more partitions of the one or more HSMs, wherein the API uses cryptography to communicate with the one or more HSMs to identify the encryption key, and wherein identifying the encryption key from the plurality of encryption keys comprises:

identifying the entity making the request through the API;

identifying the one or more partitions for the entity; and comparing the application of the entity making the request with application identifiers associated with the plurality of encryption keys for the one or more partitions to identify the application identifier corresponding to the application; and provide the encryption key from the one or more partitions for the entity to the application for decryption.

2. The system of claim 1, wherein the one or more processing devices are configured to execute the computer readable code to:

set up the one or more HSMs to provide encryption services to a plurality of applications, wherein setting up the one or more HSMs comprises assigning each of the entities and the plurality of applications of the entities to the one or more HSMs and to the one or more partitions of the plurality of partitions within the one or more HSMs; and create the API to interact with the plurality of applications.

3. The system of claim 2, wherein the one or more processing devices are configured to execute the computer readable code to:

receiving a request from a user of the application to set up the encryption for the application using a graphical user interface (GUI) to request the encryption key through the API, wherein the encryption for the application is set up through the GUI without the user providing cryptographic programming;

utilize the encryption key to encrypt application data; and store the encryption key within the one or more HSMs.

4. The system of claim 1, wherein the entities and the applications of the entities utilize the API to select different encryption for different data used by the entities and the applications of the entities.

5. The system of claim 1, wherein authenticating the application for access to the one or more HSMs comprises identifying access rights of the application from an encryption rules engine within one or more encryption systems.

6. The system of claim 1, wherein the one or more processing devices are configured to execute the computer readable code to:

assigning the application identifier to the encryption key.

7. The system of claim 6, wherein the application identifier is a machine identifier on which the application is stored.

8. The system of claim 1, wherein providing the encryption key to the application for decryption comprises:

receiving encrypted data from the application for decryption;

identifying data from the encrypted data using the encryption key; and providing the application the data decrypted.

9. A computer implemented method for a centralized hardware security module (HSM) system for encryption, the method comprising:

receiving, by one or more processing components, a request from an application of an entity to call an encryption key from one or more HSMs through an application programming interface (API), wherein the one or more HSMs each comprises a plurality of partitions, wherein the plurality of partitions separate memory of each the one or more HSMs into separate parts of each of the one or more HSMs, and wherein the plurality of partitions are separated based on entities and applications for the entities;

authenticating, by the one or more processing components, the application for access to the one or more HSMs;

identifying, by the one or more processing components, the encryption key from a plurality of encryption keys for the application within a partition of one or more partitions of the one or more HSMs, wherein the API uses cryptography to communicate with the one or more HSMs to identify the encryption key, and wherein identifying the encryption key from the plurality of encryption keys comprises:

identifying the entity making the request through the API;

identifying the one or more partitions for the entity; and comparing the application of the entity making the request with application identifiers associated with the plurality of encryption keys for the one or more partitions to identify the application identifier corresponding to the application; and providing, by the one or more processing components, the encryption key from the one or more partitions for the entity to the application for decryption.

10. The computer implemented method of claim 9, the method further comprising:

setting up, by the one or more processing components, the one or more HSMs to provide encryption services to a plurality of applications, wherein setting up the one or more HSMs comprises assigning each of the entities and the plurality of applications of the entities to the one or more HSMs and to the one or more partitions of the plurality of partitions within the one or more HSMs; and creating, by the one or more processing components, the API to interact with the plurality of applications.

11. The computer implemented method of claim 10, the method further comprising:

receiving, by the one or more processing components, a request from a user of the application to set up the encryption for the application using a graphical user interface (GUI) to request the encryption key through the API, wherein the encryption for the application is set up through the GUI without the user providing cryptographic programming;

utilizing, by the one or more processing components, the encryption key to encrypt application data; and storing, by the one or more processing components, the encryption key within the one or more HSMs.

12. The computer implemented method of claim 9, wherein the entities and the applications of the entities utilize the API to select different encryption for different data used by the entities and the applications of the entities.

13. The computer implemented method of claim 9, wherein authenticating the application for access to the one or more HSMs comprises identifying access rights of the application from an encryption rules engine within one or more encryption systems.

14. The computer implemented method of claim 9, the method further comprising:

assigning, by the one or more processing components, the application identifier to the encryption key.

15. The computer implemented method of claim 14, wherein the application identifier is a machine identifier on which the application is stored.

16. The computer implemented method of claim 9, wherein providing the encryption key to the application for decryption comprises:

receiving encrypted data from the application for decryption;

identifying data from the encrypted data using the encryption key; and providing the application the data decrypted.

17. A computer program product for a centralized hardware security module (HSM) for encryption, the computer program product comprising at least one non-transitory computer-readable medium having computer-readable program code portions embodied therein, the computer-readable program code portions comprising:

an executable portion configured to receive a request from an application of an entity to call an encryption key from one or more HSMs through an application programming interface (API), wherein the one or more HSMs each comprises a plurality of partitions, wherein the plurality of partitions separate memory of each the one or more HSMs into separate parts of each of the one or more HSMs, and wherein the plurality of partitions are separated based on entities and applications for the entities;

an executable portion configured to authenticate the application for access to the one or more HSMs;

an executable portion configured to identify the encryption key from a plurality of encryption keys for the application within a partition of one or more partitions of the one or more HSMs, wherein the API uses cryptography to communicate with the one or more HSMs to identify the encryption key, and wherein identifying the encryption key from the plurality of encryption keys comprises:

identifying the entity making the request through the API;

identifying the one or more partitions for the entity; and comparing the application of the entity making the request with application identifiers associated with the plurality of encryption keys for the one or more partitions to identify the application identifier corresponding to the application; and an executable portion configured to provide the encryption key from the one or more partitions for the entity to the application for decryption.

18. The computer program product of claim 17, wherein the computer-readable program code portions further comprise:

an executable portion configured to set up the one or more HSMs to provide encryption services to a plurality of applications, wherein setting up the one or more HSMs comprises assigning each of the entities and the plurality of applications of the entities to the one or more HSMs and to the one or more partitions of the plurality of partitions within the one or more HSMs; and an executable portion configured to create the API to interact with the plurality of applications.

19. The computer program product of claim 17, wherein the entities and the applications of the entities utilize the API to select different encryption for different data used by the entities and the applications of the entities.

20. The computer program product of claim 17, wherein the computer-readable program code portions further comprise:

an executable portion configured to receive a request from a user of the application to set up encryption for the application using a graphical user interface (GUI) to request the encryption key through the API, wherein the encryption for the application is set up through the GUI without the user providing cryptographic programming;

an executable portion configured to utilize the encryption key to encrypt application data; and an executable portion configured to store the encryption key within the one or more HSMs.

\* \* \* \* \*